(12) United States Patent
Lee

(10) Patent No.: US 8,957,611 B2
(45) Date of Patent: Feb. 17, 2015

(54) STARTING DEVICE FOR HIGH-VOLTAGE COMPONENTS OF FUEL CELL VEHICLE AND METHOD FOR CONTROLLING THE SAME

(75) Inventor: Chang Ha Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 605 days.

(21) Appl. No.: 13/026,458

(22) Filed: Feb. 14, 2011

(65) Prior Publication Data

US 2012/0098332 A1 Apr. 26, 2012

(30) Foreign Application Priority Data

Oct. 25, 2010 (KR) ........................ 10-2010-0104289

(51) Int. Cl.
| | |
|---|---|
| *H02P 1/00* | (2006.01) |
| *B60W 20/00* | (2006.01) |
| *B60W 10/26* | (2006.01) |
| *B60W 10/28* | (2006.01) |
| *B60L 11/18* | (2006.01) |

(52) U.S. Cl.
CPC .............. *B60W 20/00* (2013.01); *B60W 10/26* (2013.01); *B60W 10/28* (2013.01); *B60L 11/1885* (2013.01); *Y02T 90/34* (2013.01)
USPC ....................................................... 318/255

(58) Field of Classification Search
CPC . A63H 19/14; A63H 19/24; A63H 2019/246; B21B 37/52; B21B 37/54
USPC ......... 180/65.21; 318/255, 53, 201, 280, 301, 318/362
See application file for complete search history.

(56) References Cited

U.S. PATENT DOCUMENTS

| | | | | |
|---|---|---|---|---|
| 8,384,237 | B2 * | 2/2013 | Nefcy et al. .................... | 307/9.1 |
| 2002/0024306 | A1 * | 2/2002 | Imai et al. ........................ | 318/34 |
| 2003/0195083 | A1 * | 10/2003 | Tabata ........................ | 477/168 |
| 2004/0126628 | A1 * | 7/2004 | Balliet et al. .................... | 429/13 |
| 2005/0001480 | A1 * | 1/2005 | Tabata et al. .................. | 303/141 |
| 2006/0113129 | A1 * | 6/2006 | Tabata ........................ | 180/65.2 |
| 2006/0141353 | A1 * | 6/2006 | Watanabe et al. ............. | 429/148 |
| 2006/0222910 | A1 * | 10/2006 | Aoyagi et al. ................... | 429/12 |
| 2007/0222413 | A1 * | 9/2007 | Kinoshita et al. ............. | 320/104 |
| 2008/0184706 | A1 * | 8/2008 | Uno et al. ........................ | 60/667 |
| 2008/0315803 | A1 * | 12/2008 | Yonemori et al. ............ | 318/148 |
| 2009/0029819 | A1 * | 1/2009 | Tabata et al. ...................... | 475/5 |
| 2009/0200053 | A1 * | 8/2009 | Scrimshaw et al. ............. | 173/47 |

(Continued)

FOREIGN PATENT DOCUMENTS

| | | |
|---|---|---|
| JP | 11288730 A | 10/1999 |
| JP | 2000090949 A | 3/2000 |
| JP | 2002158026 A | 5/2002 |
| JP | 2005259692 A | 9/2005 |

*Primary Examiner* — Kawing Chan
*Assistant Examiner* — Zoheb Imtiaz
(74) *Attorney, Agent, or Firm* — Mintz Levin Cohn Ferris Glovsky and Popeo, P.C.; Peter F. Corless

(57) ABSTRACT

The present invention provides a starting device for high-voltage components of a fuel cell vehicle and a method for controlling the same, which can improve starting performance during start-up of the fuel cell vehicle by eliminating a DC-DC converter for the operation of the high-voltage components (e.g., air blower, water pump, etc.) of the fuel cell vehicle, and mounting a separate starting means, which can be operated solely by the power of a 12 V battery, directly on a drive shaft of the high-voltage component.

6 Claims, 5 Drawing Sheets

(56) References Cited

U.S. PATENT DOCUMENTS

| | | | |
|---|---|---|---|
| 2009/0318261 A1* | 12/2009 | Tabata et al. | 477/3 |
| 2010/0025133 A1* | 2/2010 | Hamada et al. | 180/65.31 |
| 2010/0104906 A1* | 4/2010 | Hirakawa et al. | 429/22 |
| 2010/0151988 A1* | 6/2010 | Tabata et al. | 477/3 |
| 2010/0181125 A1* | 7/2010 | Wang et al. | 180/65.22 |
| 2011/0003222 A1* | 1/2011 | Margiott et al. | 429/429 |
| 2011/0174561 A1* | 7/2011 | Bowman | 180/65.245 |

\* cited by examiner

STARTING DEVICE FOR HIGH-VOLTAGE COMPONENTS OF FUEL CELL VEHICLE AND METHOD FOR CONTROLLING THE SAME

CROSS-REFERENCE TO RELATED APPLICATION

This application claims under 35 U.S.C. §119(a) the benefit of Korean Patent Application No. 10-2010-0104289 filed Oct. 25, 2010, the entire contents of which are incorporated herein by reference.

BACKGROUND (a) Technical Field

The present invention relates to a starting device for high-voltage components of a vehicle, particularly a fuel cell vehicle. More particularly, it relates to a starting device for high-voltage components of a fuel cell vehicle and a method for controlling the same, which can improve starting performance during start-up of the fuel cell vehicle by providing a separate starting means, which is driven by the power of a 12 V battery, in high-voltage components equipped in the fuel cell vehicle.

(b) Background Art

A typical fuel cell system applied to a fuel cell vehicle comprises a fuel cell stack for generating electricity by an electrochemical reaction between reactant gases, a fuel supply system for supplying hydrogen as a fuel to the fuel cell stack, an air supply system for supplying oxygen containing air as an oxidant required for the electrochemical reaction in the fuel cell stack, and a thermal management system for controlling the operating temperature of the fuel cell stack.

Each of the above systems of the fuel cell vehicle comprises a high-voltage component. For example, the air supply system comprises an air blower, and the thermal management system comprises a water pump.

The high-voltage components, such as the air blower, water pump, etc., cannot be driven directly by the power of a 12 V battery. Thus, they are driven by a high voltage generated by boosting the voltage of the 12 V battery, and then they are operated by the power generated from the fuel cell stack during normal operation.

Therefore, during start-up of the fuel cell vehicle, a DC-DC converter for generating a high-voltage by boosting the voltage of the 12 V battery is required for the operation of the high-voltage components.

FIG. 3 schematically shows the configuration of a fuel cell stack mounted in a fuel cell vehicle, and an air supply system for supplying oxygen containing air to the fuel cell stack.

As shown in FIG. 3, during start-up of the fuel cell vehicle, a high voltage is generated by boosting the voltage of a 12 V battery 16 at a DC-DC converter 18, and is supplied to an air blower 14 (a high voltage component) through an air blower controller 12.

Then, the oxygen in the air is supplied to a fuel cell stack 10 by the operation of the air blower 14 and, at the same time, hydrogen is supplied from a fuel supply system to the fuel cell stack 10 such that the fuel cell stack 10 generates electricity.

When the fuel cell stack 10 normally generates electricity, the air blower 14 is driven by the power generated from the fuel cell stack 10.

However, the DC-DC converter 18 is necessarily used to boost the voltage of the 12 V battery 16 during start-up of the fuel cell vehicle. This causes a number of problems.

First, the DC-DC converter 18 needs a large installation space and causes some problems such as reduction in fuel efficiency, heat generation, etc. during power conversion.

Moreover, although the high voltage generated by boosting the voltage of the 12 V battery 16 at the DC-DC converter 18 is supplied to the air blower 14, the rotational speed of the air blower 14 during initial operation is about 7,000 to 8,000 rpm. This is lower than the designed value, and thus the operation efficiency is reduced.

In particular, as shown in FIG. 4, the high voltage generated by boosting the voltage of the 12 V battery 16 at the DC-DC converter 18 is supplied to a high-voltage motor 22 of the air blower 14. At the same time, a compressor 24 having the same axis as the compressor 24 is driven to compress air. However, the rotational speed of the high-voltage motor 22 during initial operation is about 7,000 to 8,000 rpm. This is lower than the designed value, and thus the operation efficiency is reduced.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides a starting device for high-voltage components of a fuel cell vehicle and a method for controlling the same. The starting device of the present invention can improve starting performance during start-up of the fuel cell vehicle by eliminating a DC-DC converter for the operation of the high-voltage components (e.g., air blower, water pump, etc.) of the fuel cell vehicle, and by mounting a separate starting means, which can be operated only by the power of a 12 V battery, directly on a drive shaft of the high-voltage component.

In one aspect, the present invention provides a starting device for a high-voltage component of a fuel cell vehicle comprising a fuel cell stack and a 12 V battery, the device comprising: a low-voltage motor coaxially connected to a high-voltage motor as a high-voltage component; a clutch mounted on a shaft connecting the high-voltage motor and the low-voltage motor; and a controller for supplying a current from the 12 V battery to the low-voltage motor or for supplying a current generated by the fuel cell stack to the high-voltage motor.

In a preferred embodiment, the high-voltage component is an air blower comprising a high-voltage motor and a compressor in connection with an output shaft of the high-voltage motor.

In another preferred embodiment, the high-voltage component is a water pump comprising a high-voltage motor and a pumping unit in connection with an output shaft of the high-voltage motor.

In still another preferred embodiment, the clutch is a one-way clutch.

In one aspect, the present invention provides a method for controlling a starting device for a high-voltage component of a fuel cell vehicle, the method comprising: supplying a current from a 12 V battery to a low-voltage motor during start-up; allowing an output shaft of a high-voltage motor, which is in connection with the low-voltage motor by a clutch, to be driven by the operation of the low-voltage motor such that the high-voltage component is operated; allowing a fuel cell stack to generate electricity in connection with the operation of the high-voltage component; supplying a current from the fuel cell stack to the high-voltage motor of the high-voltage component; and allowing the high-voltage component to be operated by the driving force of the high-voltage motor, and preferably only by the driving force of the high-voltage motor.

In a preferred embodiment, the method further comprises, when the current is supplied to the high-voltage motor, cutting off the current from the 12 V battery to the low-voltage motor.

In another preferred embodiment, the method further comprises, when the operation of the high-voltage motor is started, disengaging the clutch from the low-voltage motor to prevent the rotation of the low-voltage motor.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
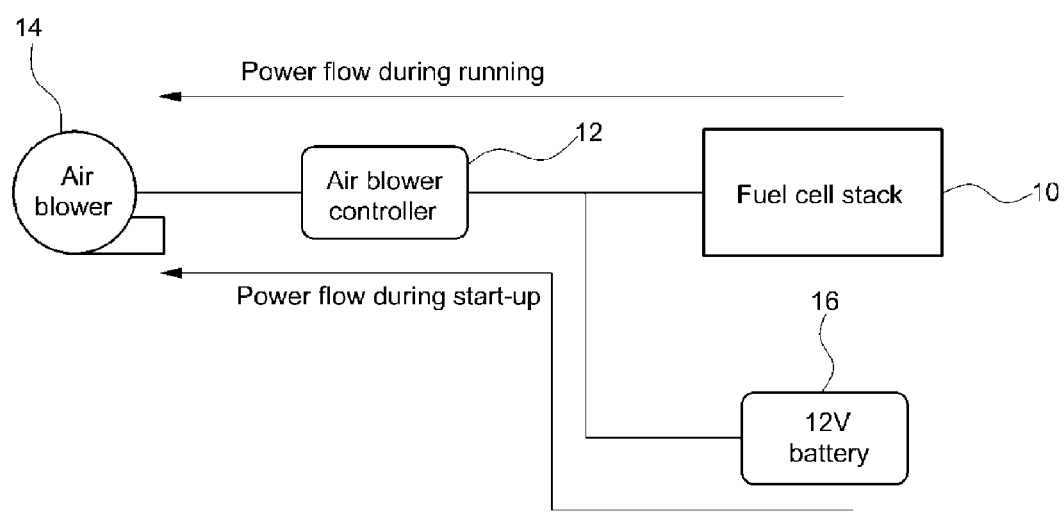
FIG. 1 is a schematic diagram showing the power flow during start-up by a starting device for high-voltage components of a fuel cell vehicle and during running of the fuel cell vehicle in accordance with an embodiment of the present invention.

Reference numerals set forth in the Drawings includes reference to the following elements as further discussed below:

| 10: fuel cell stack | 12: controller |
| 14: air blower | 16: 12 V battery |
| 18: DC-DC converter | 20: low-voltage motor |
| 21: clutch | 22: high-voltage motor |
| 24: compressor | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention aims at improve starting performance during start-up of a fuel cell vehicle by mounting a separate starting means, which can operate high-voltage components, such as an air blower, water pump, etc, by the power of a 12 V battery, directly on a drive shaft of the high-voltage component.

In accordance with embodiments of the present invention, the high-voltage components are driven by a high-voltage motor. In particular, embodiments of the present invention provide a fuel supply system mounted in a fuel cell system for supplying hydrogen to a fuel cell stack, an air supply system for supplying oxygen containing air to the fuel cell stack, and a thermal management system for controlling the operating temperature of the fuel cell stack. Examples of the high-voltage components may include an air blower of the air supply system, a water pump of the thermal management system, etc.

To facilitate understanding of the present invention, the present invention will be further described in detail by taking an example in which the high-voltage component is the air blower.

Figure 2A:
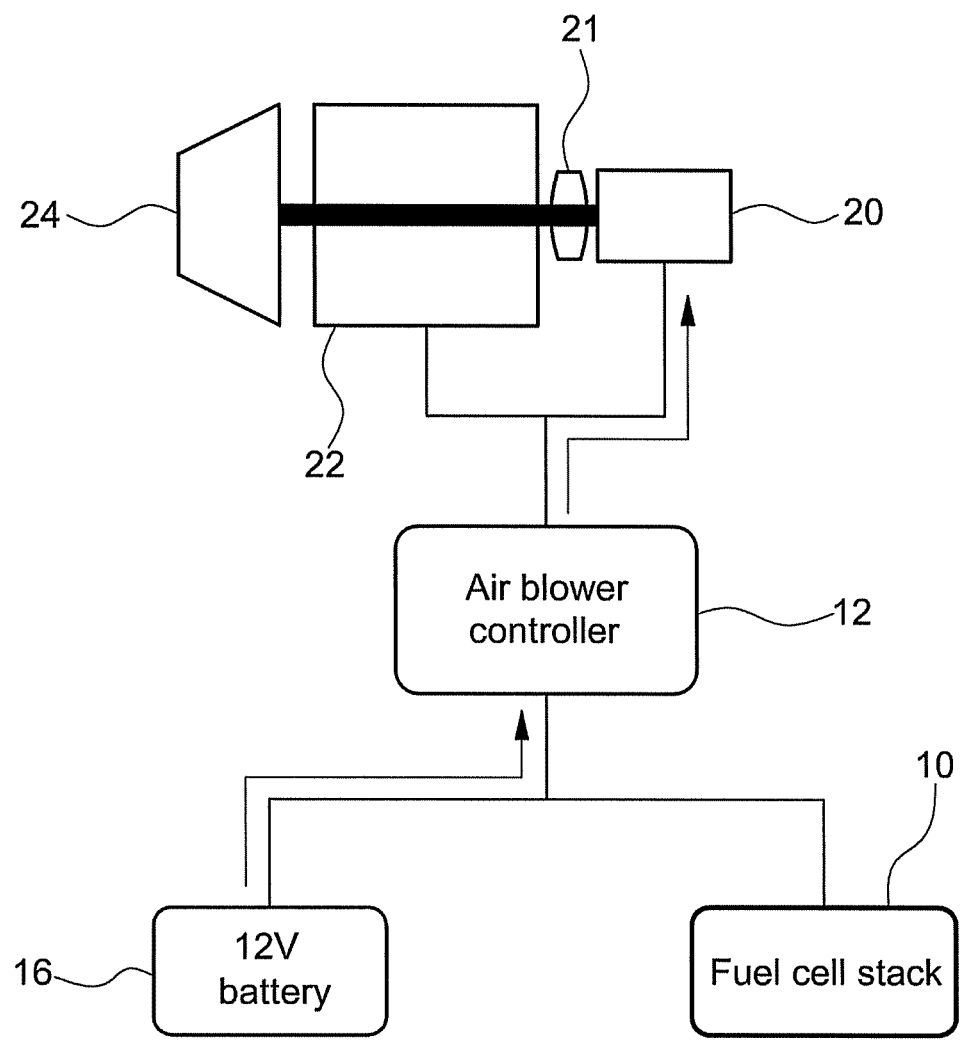
FIGS. 2A and 2b are schematic diagrams showing a starting device for high-voltage components of a fuel cell vehicle and a method for controlling the same in accordance an embodiment of with the present invention.
Figure 2B:
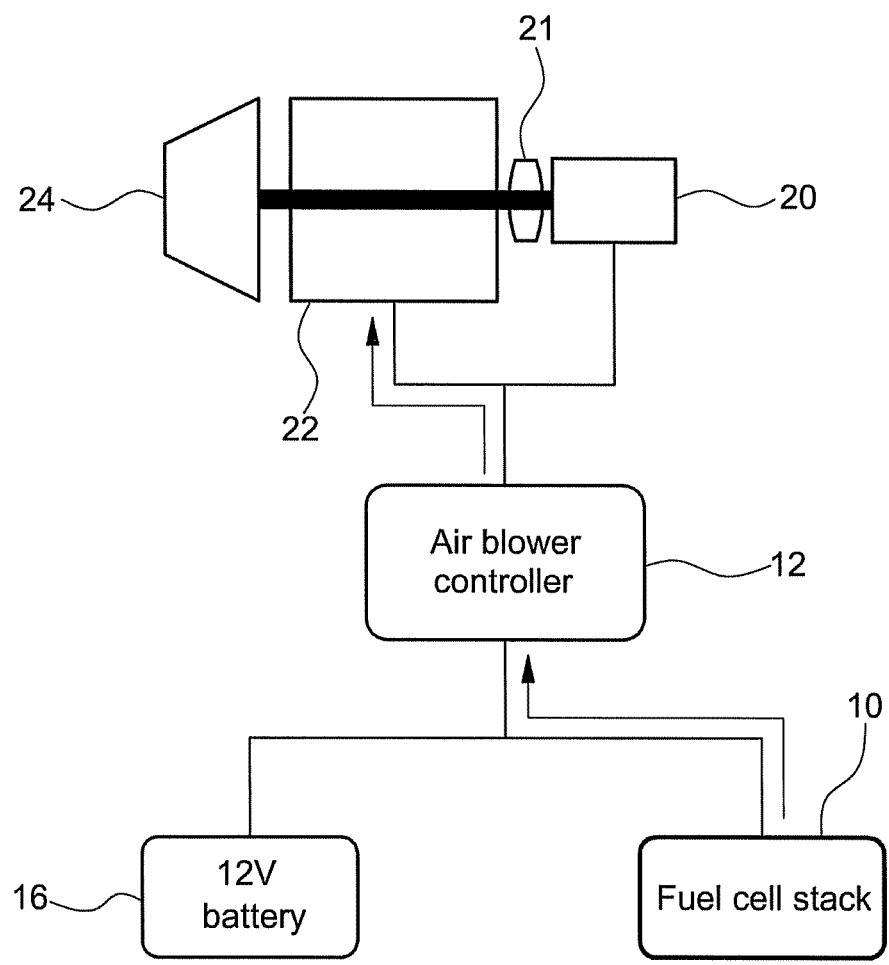
Figure 3:
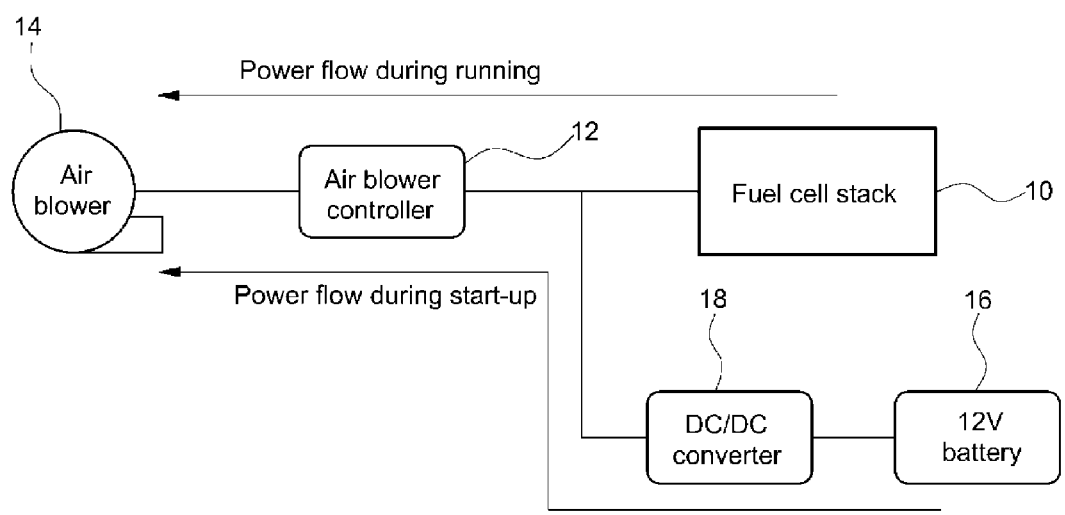
FIG. 3 is a schematic diagram showing the power flow during start-up by a conventional starting device for high-voltage components of a fuel cell vehicle and during running of the fuel cell vehicle.
Figure 4:
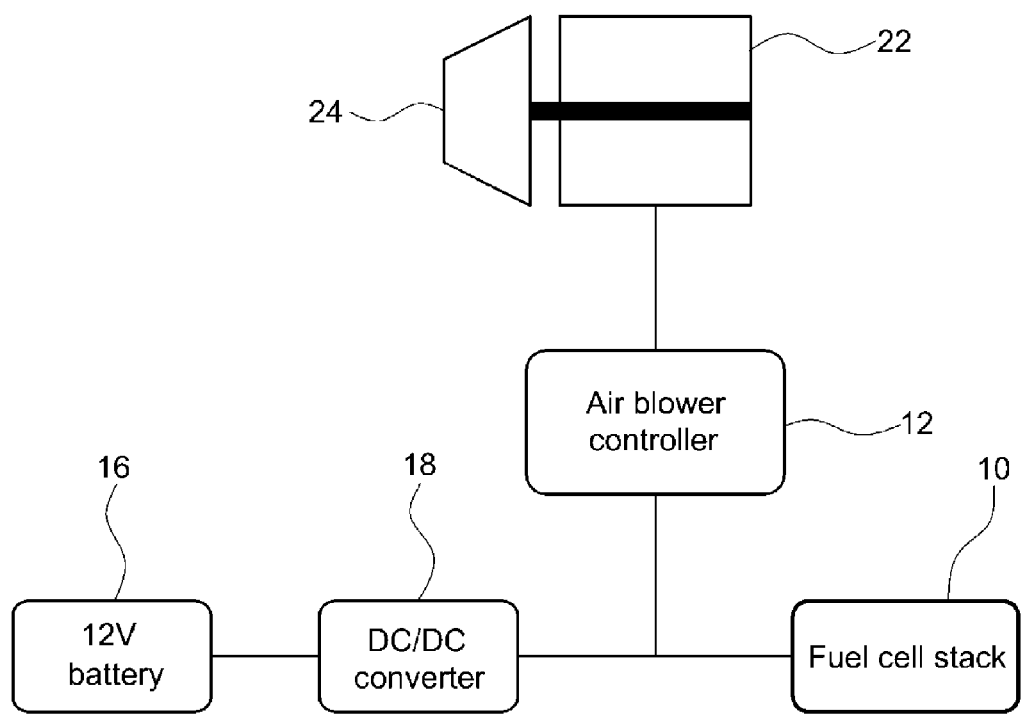
FIG. 4 is a schematic diagram showing a conventional starting device for high-voltage components of a fuel cell vehicle and a method for controlling the same.

As shown in FIGS. 2A and 2B, the air blower 14 comprises a compressor 24 for compressing air. The configuration of the air blower 14 and compressor 24 can be in accordance with known devices. By way of example, as shown in the figures, the air blower 14 can use an impeller and a high-voltage motor 22 coaxially connected to the compressor 24 to rotate the compressor 24.

According to an embodiment of the present invention, a low-voltage motor 20 is in connection with the high-voltage motor 22, and a clutch 21 is disposed between the high-voltage motor 22 and the low-voltage motor 20. For example, as shown, the low-voltage motor 20 can be coaxially connected to the rear of the high-voltage motor 22, with the clutch 21 mounted on a shaft or the like connecting the high-voltage motor 22 and the low-voltage motor 20.

Preferably, the clutch 21 is a one-way clutch allowing one-way rotation. The one-way clutch 21 functions to transmit the driving force of the low-voltage motor 20 to the compressor 24 and to prevent the rotation of the low-voltage motor 20 during operation of the high-voltage motor 22.

As shown, a controller 12 for supplying a current generated by the fuel cell stack 10 and for controlling the rotational speed (RPM) of the high-voltage motor 22 can be in connection with the high-voltage motor 22. Moreover, the controller 12 can be in connection with the low-voltage motor 20 so as to supply current from a 12 V battery 16 and to control the RPM of the low-voltage motor 20.

The above-described low-voltage motor may be separately provided in a water pump comprising a high-voltage motor and a pumping unit connected to an output shaft of the high-voltage motor.

Next, the operation of the starting device for high-voltage components according to embodiments of the present invention will be described, wherein the high-voltage component is an air blower.

Referring to FIGS. 1 and 2A, during start-up of the fuel cell vehicle, the current from the 12 V battery 16 is supplied to the low-voltage motor 20 of the air blower 14 by the controller 12.

Therefore, the low-voltage motor 20 is rotated at a predetermined RPM by the control of the controller 12.

As shown, the one-way clutch 21 is disposed between the low-voltage motor 20 and the high-voltage motor 22. Thus, the rotational force of the low-voltage motor 20 is transmitted to an output shaft of the high-voltage motor 22 through the clutch 21, thereby driving the compressor 24.

As such, during start-up of the fuel cell vehicle, the compressor 24 of the air blower 14 is easily driven by the power of the 12 V battery 16, and the oxygen in the air is supplied to the fuel cell stack 10 by the operation of the compressor 24.

Therefore, the oxygen in the air is supplied to the fuel cell stack 10 by the operation of the air blower 14 and, at the same time, hydrogen is supplied to the fuel cell stack 10 such that the fuel cell stack 10 generates electricity and water in a normal operation mode.

As such, when the low-voltage motor 20 is in connection with, (e.g. coaxially connected to the rear of) the high-voltage motor 22 of the air blower 14 and the one-way clutch 21 is disposed between the low-voltage motor 20 and the high-voltage motor 22, the initial operation of the fuel cell stack 10 can be performed solely by the power of the 12 V battery 16 during start-up of the fuel cell vehicle.

In particular, since high voltage is not generated in the fuel cell system during start-up of the vehicle, the low-voltage motor 20 can be driven by the power of the 12 V battery 16 to drive the compressor 24. As such, the air generated by the compressor 24 can be supplied to the fuel cell stack 10 for the normal operation.

When the vehicle is running during normal operation of the fuel cell stack 10, the controller 12 can cut off the power of the 12 V battery 16 and, at the same time, supply the current generated by the fuel cell stack 10 to the high-voltage motor 22.

As the current from the fuel cell stack 10 is supplied to the high-voltage motor 22 of the air blower 14, the compressor 24 of the air blower 14 can be normally operated by the driving force of the high-voltage motor 22.

When the current from the fuel cell stack 10 is supplied to the high-voltage motor 22, the controller 12 can cut off the current from the 12 V battery 16 to the low-voltage motor 20. Moreover, when the operation of the high-voltage motor 22 is started, the clutch 21 can be disengaged from the low-voltage motor 20, such that the low-voltage motor 20 is no longer driven.

While the air blower is a high-voltage component having an initial rotational speed of about 40,000 to 50,000 RPM, if it is driven at about 7,000 to 8,000 RPM during start-up, the operation efficiency is significantly reduced. As a result, the load of the existing DC-DC converter is increased, which reduces the operation efficiency and generates heat.

However, according to the present invention, the air blower can be directly driven by the 12 V battery and the low-voltage motor during start-up. Thus, in accordance with the present invention, it is possible to drive the air blower with a relatively low power.

Conventionally, if the power required by the compressor of the air blower is 200 W, for example, a power of 312 W is required to drive the compressor, even assuming that the operation efficiency of the DC-DC converter is 80% and that of the high-voltage motor is 80%. However, in the case where the compressor is directly driven by the low-voltage motor, it is possible to drive the compressor with a power of 250 W, even if the operation efficiency of the motor is only 80%.

As described above, the present invention provides the following effects.

According to the present invention, it is possible to easily drive the high-voltage components solely by the driving force of the low-voltage motor by the 12 V battery during start-up of the fuel cell vehicle. In particular, the existing DC-DC converter for the operation of the high-voltage components (e.g., air blower, water pump, etc.) of the fuel cell vehicle is eliminated, and the low-voltage motor is mounted as a separate starting means directly on the drive shaft of the high-voltage component, hereby allowing operation solely by the power of the 12 V battery.

Moreover, as the high-voltage component can be easily driven by a small power, the normal operation of the fuel cell stack can be more rapidly performed, and it is thus possible to improve the starting performance of the fuel cell vehicle.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A starting device for a high-voltage component of a fuel cell vehicle comprising a fuel cell stack and a 12 V battery, the device comprising:
    a low-voltage motor coaxially connected to a high-voltage motor as a high-voltage component, wherein the high-voltage motor is connected to a first shaft;
    a clutch mounted on a second shaft connecting the high-voltage motor and the low-voltage motor; and
    a controller configured to supply a current from the 12 V battery to the low-voltage motor or to supply a current generated by the fuel cell stack to the high-voltage motor,
    wherein the controller is configured to cut off the current from the 12V battery to the low-voltage motor when the current is being supplied to the high voltage motor,
    wherein the low-voltage motor is coaxially connected to a rear of the high-voltage motor through the second shaft and the clutch is coaxially mounted on the second shaft between the high-voltage motor and the low-voltage motor so that a rotational force of the low-voltage motor is transmitted directly to the first shaft of the high-voltage motor through the clutch.

2. The device of claim 1, wherein the high-voltage component is an air blower comprising a high-voltage motor and a compressor connected to the first shaft of the high-voltage motor.

3. The device of claim 1, wherein the high-voltage component is a water pump comprising a high-voltage motor and a pumping unit connected to the first shaft of the high-voltage motor.

4. The device of claim 1, wherein the clutch is a one-way clutch.

5. A method for controlling a starting device for a high-voltage component of a fuel cell vehicle, the method comprising:
- supplying a current from a 12 V battery to a low-voltage motor during start-up;
- transmitting a rotational force of the low-voltage motor directly to an first shaft of the high-voltage motor through the clutch to operate high voltage components, wherein the rotational force is transmitted by coaxially connecting the low-voltage motor to a rear of the high-voltage motor through a second shaft, wherein the clutch is coaxially mounted on the second shaft;
- allowing a fuel cell stack to generate electricity in connection with the operation of the high-voltage component;
- supplying a current from the fuel cell stack to the high-voltage motor of the high-voltage component; and
- allowing the high-voltage component to be operated only by the driving force of the high-voltage motor; and
- cutting off the current from the 12V battery to the low-voltage motor when the current is being supplied to the high voltage motor.

6. The method of claim 5, further comprising, when the operation of the high-voltage motor is started, disengaging the clutch from the low-voltage motor to prevent the rotation of the low-voltage motor.

\* \* \* \* \*